Sept. 13, 1938.  C. A. NERACHER ET AL  2,129,863
POWER TRANSMISSION
Filed Nov. 14, 1934  5 Sheets-Sheet 1
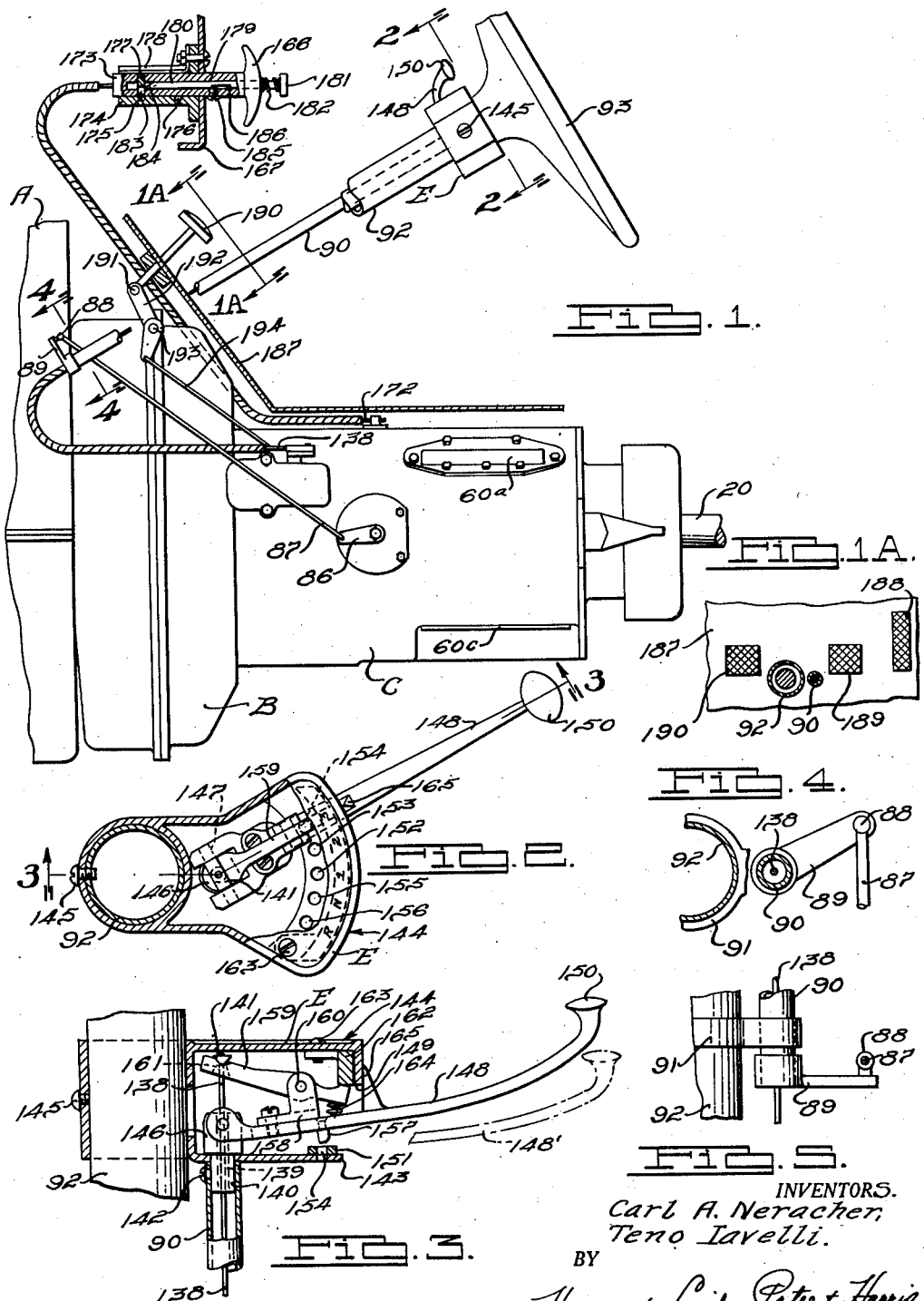
INVENTORS.
Carl A. Neracher,
Teno Iavelli.
BY
Harness, Lind, Patee + Harris
ATTORNEYS

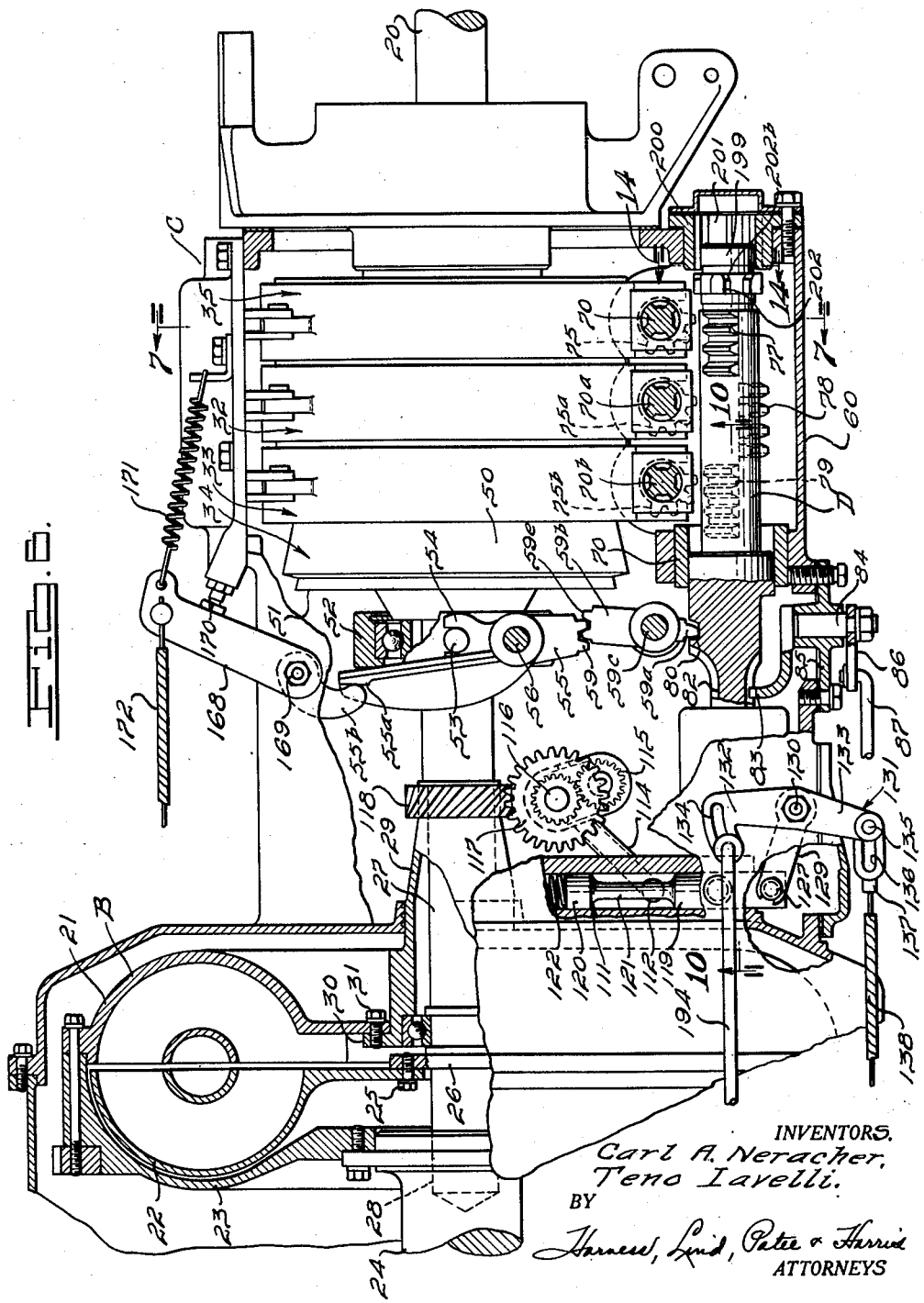

Sept. 13, 1938.  C. A. NERACHER ET AL  2,129,863
POWER TRANSMISSION
Filed Nov. 14, 1934  5 Sheets-Sheet 3
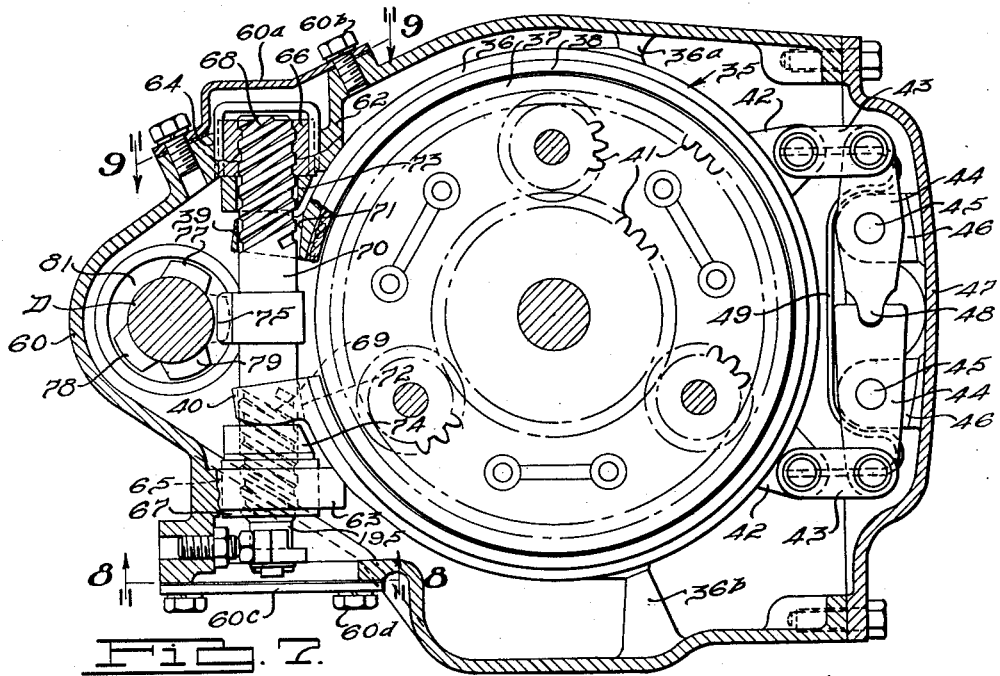
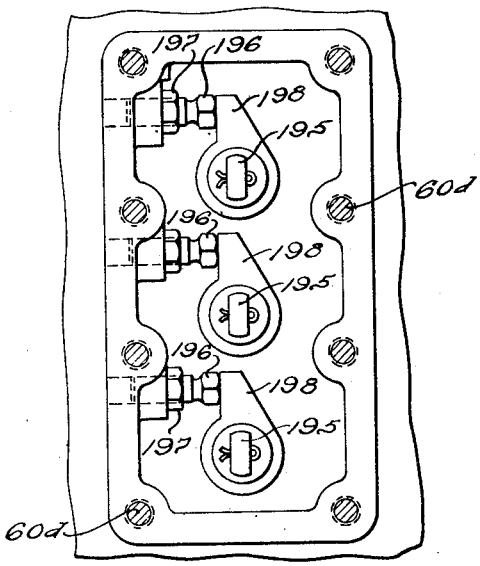
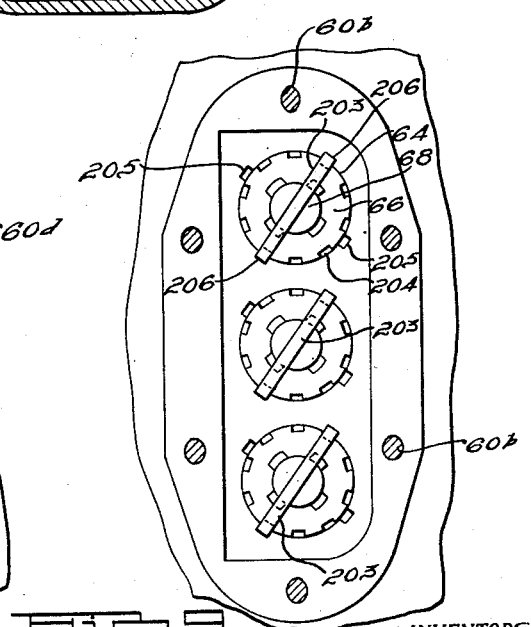
INVENTORS
Carl A. Neracher,
Teno Iavelli.
BY
Harness, Lind, Patee & Harris
ATTORNEYS

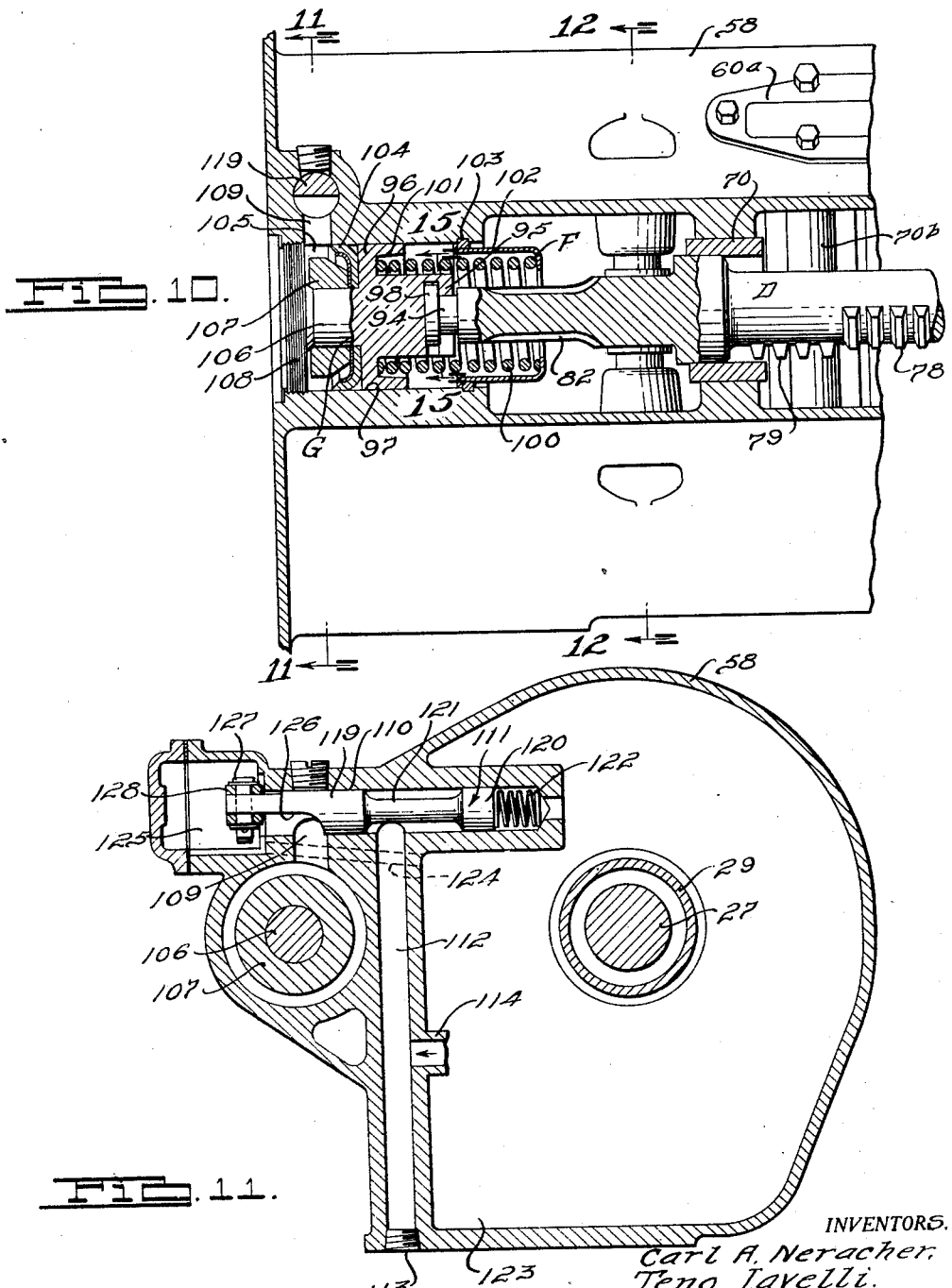

Sept. 13, 1938.  C. A. NERACHER ET AL  2,129,863
POWER TRANSMISSION
Filed Nov. 14, 1934  5 Sheets-Sheet 5

INVENTORS.
Carl A. Neracher,
Teno Iavelli.
BY
Harness, Dind, Patee & Harris
ATTORNEYS Patented Sept. 13, 1938

2,129,863

UNITED STATES PATENT OFFICE 2,129,863

POWER TRANSMISSION

Carl A. Neracher, Detroit, and Teno Iavelli, Dearborn, Mich., assignors to Chrysler Corporation, Detroit, Mich., a corporation of Delaware Application November 14, 1934, Serial No. 752,948

46 Claims. (Cl. 74—262)

This invention relates to power transmission devices and refers more particularly to improvements in power transmission devices or systems especially adapted for use in connection with motor vehicles, although not necessarily limited thereto.

Our invention, in certain more limited aspects thereof, provides improvements in the drive and control for power transmission systems of the type including the well-known epicyclic or planetary transmission gear box. With such planetary transmissions, it is customary to arrange the gearing to provide for the desired number of speed ratios between the engine and vehicle driving ground wheels and such gearing is customarily selected and controlled to obtain the desired speed ratio by actuation of any one of a group of transmission gearing controlling clutches usually consisting of reaction brake bands associated with and controlling the rotation of corresponding drums or similar elements of the various planetary gear trains.

One object of our invention resides in the provision of an improved selector and actuating mechanism for obtaining the several speed ratios provided by the transmission or other speed changing mechanism, the latter preferably being of the planetary gear type although not necessarily limited thereto in the broader aspects of our invention.

A further object of our invention resides in the provision of improved controls and actuating mechanism for selecting and manipulating the various gear trains of a transmission, particularly a planetary type of transmission, whereby means is provided responsive to manual control for automatically bringing about a complete cycle of gear ratio change. Thus, in one embodiment of our invention we have provided fluid pressure actuating means responsive to operation of manual control for first releasing the rotary drum of one of the planetary gear trains and then braking another drum associated with the transmission for establishing a further gear ratio drive for the motor vehicle.

In carrying out the above objects of our invention, we have provided a common actuator or prime mover which may be of the fluid pressure type for applying the necessary force to the braking devices in order to control the rotation of the desired drum of the planetary gearing, a selector mechanism being provided under manual control of the vehicle driver for selectively causing the common actuator to apply a braking force to the proper drum. This actuator may be of the fluid pressure type adapted for operation by oil pressure, air pressure either above or below atmospheric pressure, or other equivalent systems. We prefer, according to the teachings of this phase of our invention, to provide for energizing the actuator by oil pressure.

A further object of our invention resides in the provision of an improved selector mechanism for use with speed ratio changing mechanisms of the character aforesaid. In one embodiment of our invention this selector mechanism may be operated by fluid pressure under manual adjustment or control, the mechanism further including a novel manual control means for progressively cutting off the supply of fluid pressure, adjusting the selector mechanism to a new position of speed ratio control, and then cutting in the supply of fluid pressure preferably by one continuous series or progression of manual control movement in effecting a speed ratio change in the driving mechanism.

A further object of our invention is to provide improved transmission control means incorporating a fluid pressure controlling valve adapted for manual operation selectively by the vehicle operator at a plurality of different points of control as by a hand and a foot of the operator.

Another object of our invention resides in the provision of improved means for applying the braking force selectively to the various braking devices of the planetary gear trains, this means including a shaft or other operating element adapted for rotary selective adjustment and for reciprocating movement in an improved and simplified manner to release and actuate the various braking devices. According to our preferred embodiment, this shaft is formed with a plurality of circumferentially and longitudinally spaced sets of rack-like teeth respectively adapted for actuating the braking devices.

A further object of our invention resides in the provision of improved means, preferably in the form of an oppositely threaded screw, associated with each of the braking devices and cooperating with the aforesaid operating shaft to actuate the braking devices; also in the provision of improved adjusting means for the brake or clutch bands of the planetary gear sets and further in the provision of simplified and improved means insuring proper alignment of the rack teeth and the teeth of the various threaded screws for the braking devices.

Another object of our invention is to provide a novel manually operable transmission control auxiliary or supplemental to the normal or main transmission controlling system whereby, on any failure of the latter system, the auxiliary control may be readily operated under manual control to effect a drive through the transmission in at least one speed ratio thereof until the main system may be repaired or in preference to use of the main system.

An additional object of our invention resides in the provision of improved fluid pressure operating means to furnish the necessary power to operate the several speed ratio controlling devices or braking means in the case of a planetary transmission. While this power actuating means is preferably arranged to actuate these devices, another prime mover preferably in the form of one or more springs is provided for the release of the devices.

A planetary type of transmission presents a number of advantages over the more conventional sliding gear types of transmissions, and our invention is therefore primarily directed toward planetary types of transmissions and power transmission systems employing planetary gear speed ratio controlling devices although, as aforesaid, the fundamental principles of our invention may, if desired, be employed in connection with transmissions of other types including the aforesaid sliding gear types of transmissions. By way of example in connection with the aforesaid advantages of the planetary transmission over more conventional types, it may be noted that the planetary transmission especially when used in conjunction with a fluid type of clutch between the engine and transmission permits gear changes without the necessity of releasing the heretofore conventional main clutch between the engine and transmission so as to obtain relatively quick gear changes and faster acceleration of the motor vehicle. This is made possible by reason of the fact that the braking devices associated with the planetary gear trains may quickly operate, the fluid clutch smoothing the shock of the gear change by reason of its inherent slipping qualities.

Further objects and advantages of our invention will be apparent from the following detailed description of one illustrative embodiment of the principles of our invention, reference being had to the accompanying drawings, in which:

Fig. 1 is a side elevational view somewhat diagrammatic in form illustrating our power transmission mechanism as a whole, the manual control for the auxiliary transmission operating mechanism being shown in cross-section.

Fig. 1A is a detailed sectional plan view along the line 1A—1A of Fig. 1 showing somewhat diagrammatically the arrangement of the motor vehicle foot controls.

Fig. 2 is a detail sectional view along the line 2—2 of Fig. 1 showing the manually controlled selector mechanism.

Fig. 3 is a sectional view of the Fig. 2 mechanism taken along line 3—3 of Fig. 2.

Fig. 4 is a detail sectional plan view along the line 4—4 of Fig. 1 showing the steering post mounting for certain of the selector operating connections.

Fig. 5 is a side elevational view of the parts shown in Fig. 4.

Fig. 6 is an enlarged top plan view of the transmission and fluid clutch with parts thereof broken away to show the operating structure.

Fig. 7 is a sectional elevational view through the transmission illustrating one of the speed ratio controlling devices and parts associated therewith, the section being taken along the line 7—7 of Fig. 6.

Fig. 8 is a sectional bottom plan view along the line 8—8 of Fig. 7 showing the rack teeth aligning mechanism for the gear segments of the brake band operating screws.

Fig. 9 is a sectional top plan view along the line 9—9 of Fig. 7 showing the adjusting means for the brake bands.

Fig. 10 is a sectional side elevational view of the selector rack shaft operating mechanism taken along the line 10—10 of Fig. 6.

Fig. 11 is a sectional view along the line 11—11 of Fig. 10 showing the fluid pressure control valve.

Figure 12:
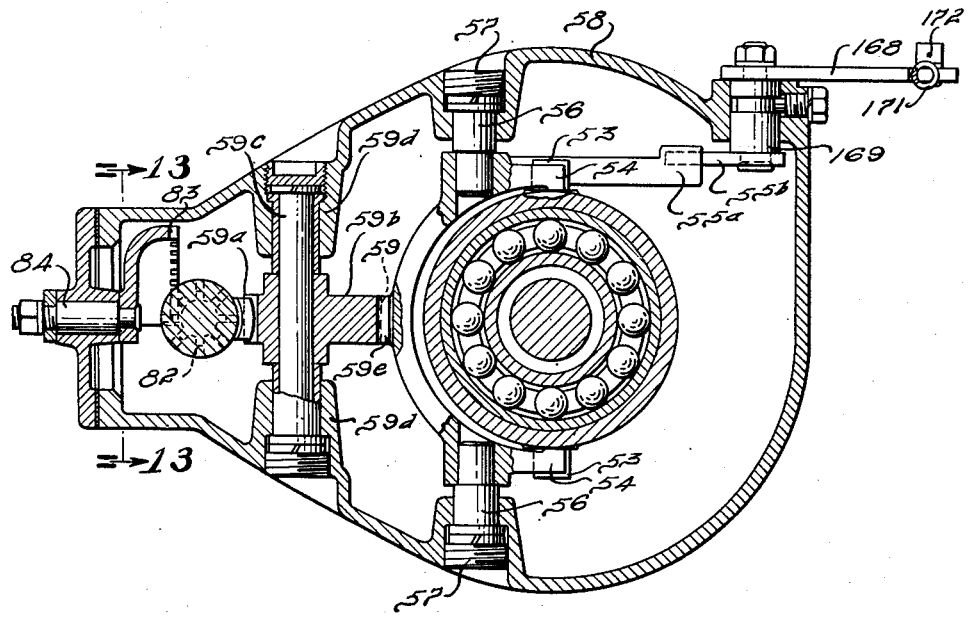
Fig. 12 is a sectional view along line 12—12 of Fig. 10 illustrating the selector rack operating means for the direct speed ratio controlling device.
Figure 13:
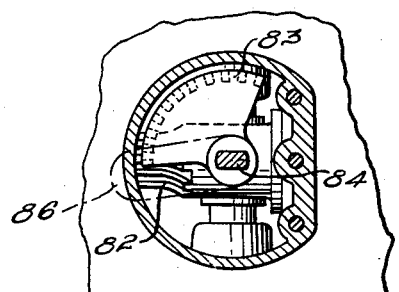
Fig. 13 is a detail sectional view along line 13—13 of Fig. 12 showing the selector rack shaft rotating device.

Referring to the drawings, we have illustrated our invention in connection with a motor vehicle drive, this drive including a prime mover or engine A, a portion of which is shown in Fig. 1, a main clutch B driven from the engine and a change speed transmission or gear box C driven from the clutch B. The drive passes from the transmission through a power take-off shaft 20 which, as usual, may extend rearwardly of the vehicle to drive the usual ground wheels (not shown).

The clutch B may be of any suitable construction for controlling the drive between engine A and transmission C, this clutch being illustrated in Figs. 1 and 6 in the form of a fluid coupling type having the usual driving and driven cooperating vane members 21 and 22, respectively. The driving vane member 21 is carried by the engine flywheel 23, the latter being connected as usual with the rear end of the engine crankshaft 24. The driven vane member 22 is connected at 25 to a flange 26 of the driven shaft 27, this shaft having a forward extension 28 piloted in the rear end of the crankshaft 24. The driven shaft 27 extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine so as to maintain the fluid pressure even when the engine is idling. It is, therefore, preferred to provide a pump drive from the driving clutch member 21 rather than the driven clutch member 22 inasmuch as the latter may be stationary under certain conditions of vehicle operation such as when the vehicle is standing still with the engine idling.

This drive may be provided by reason of a driving sleeve or hollow shaft 29 mounted on the shaft 27 but rotatable independently thereof. The sleeve 29 has a hub or flange 30 connected at 21 with the driving vane member 31 of the clutch B so that even when the driven vane member 22 is not being operated from the driving member 21, the sleeve 29 will be rotatably driven from the engine crankshaft 24 and flywheel 23. The pump drive from sleeve 29 will be more apparent hereinafter.

We have illustrated a fluid type of clutch B since a clutch of this character has a number of advantages in connection with a transmission of the planetary gear type C. Thus, the fluid type of clutch is desirable in providing a smooth drive for the vehicle through the planetary transmission, relatively high power driving efficiency, automatic release of the drive between the engine and transmission when the engine is idling and with the transmission manipulated to establish one of its driving gear ratio settings, and other well-known favorable characteristics. We desire to point out that other types of clutches may be employed to control the drive between engine A and transmission C if desired. For example, the well-known type of friction clutch may be employed and may be manually operated or automatically operated by the well-known commercial type of vacuum clutch releasing mechanism as will be readily understood.

We have illustrated the change speed transmission C as the epicyclic or planetary type, this general form of transmission being well-known in the art and, as usual, includes a plurality of transmission speed ratio controlling clutches or brakes 32, 33, 34 and 35, these braking devices being respectively adapted to actuate the transmission in its first speed ratio or low gear, second speed ratio or intermediate gear, third speed ratio or direct drive, and reverse drive.

The typical brake device 35 illustrated in Fig. 7 consists of an outer band 36 which substantially surrounds the drum 37, the band being provided with friction braking material 38 carried by the band and adapted for frictional engagement with drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 7 the reverse speed ratio braking device 35 is illustrated in its inoperative position whereby the drum 37 is free to rotate through operation of the planetary gear set 41 somewhat diagrammatically illustrated in association with the drum 37. When the braking device 35 is actuated by contracting the band 36, the drum 37 is held against rotation, the driven shaft 20 in such instance being operated through the planetary gearing 41 to provide the reverse drive for the motor vehicle.

In order to anchor the band 36 and to substantially equalize the braking forces applied to drum 37 around the periphery thereof so as to substantially avoid a tendency toward lateral loading of the drum and planetary gearing transverse to the axis of the drum, we have provided the band with a circumferentially spaced pair of anchoring flanges 42. The flanges 42 are connected through links 43 with the levers 44 pivotally mounted at 45 with the supporting brackets 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44. In order to maintain a yielding tension in the links and levers to prevent their rattling and also to exert a yielding expanding action on band 36, we have provided a ribbon-like spring 49 which passes over the brackets 46 and which has its opposite end anchored to the pivots at the opposite ends of the links 43.

In order to support the brake band assembly as a whole and to limit outward expansion of the brake band, we have provided the lugs or stops 36$^a$, 36$^b$ which project inwardly of the transmission casing as shown in Fig. 7.

The third speed clutching device 34 is arranged for a direct drive through the transmission and differs somewhat from the braking devices 32, 33 and 35 in that the clutching device 34 has its rotary element or drum 50 of the cone type adapted for clutching action by frictional engagement with an axially movable cone clutch member 51. This cone member 51 is adjustable by a collar 52 having pins 53 engaged by the yoked end 54 of an actuating lever 55 pivotally mounted by pins 56 (see Figs. 6 and 12) secured by fasteners 57 to the transmission transverse housing or casing 58. The opposite end of lever 55 is formed with gear teeth 59, the purpose of which will presently be more apparent. Forward movement of the cone clutch member 51 is limited by engagement of the lever extension shoulder 55$^a$ with a normally fixed lever stop 55$^b$, an added function of which will be presently described.

The side 60 of the transmission casing is provided with the vertically spaced inwardly extending supporting brackets 62 and 63, these brackets being formed with co-axial openings 64 and 65, respectively. Splined within the openings 64 and 65 are the nuts 66 and 67 and these nuts in turn are axially and oppositely threaded to receive the threaded ends 68 and 69 of an operating oscillatory shaft or screw 70.

The shaft 70 extends through openings 71 and 72 respectively formed in the band flanges 39 and 40, these openings preferably having considerable clearance with shaft 70 so as not to bind on the shaft when the band is contracted and expanded. In order to transmit the thrust of the nut 62 and 63 to the flanges 39 and 40, we have provided the intermediate washers 73 and 74, these washers having lower flat faces engaging the rounded top edges of the respective openings 71 and 72 so as to facilitate the operation of the band movement and relieve distorting loads at the threaded portions of shaft 70 during the operation of the band.

The operating shaft 70 of the reverse braking device 35 has its portion thereof intermediate the band ends 39 and 40 formed with an arcuate portion of a gear, the gear teeth being designated at 75, the means for oscillating the shaft 70 through the teeth 75 being more particularly hereinafter described.

In operation of the reverse speed controlling device or brake 35 as thus far described, it will be apparent that when the shaft 70 is given a rotary movement, such movement operates through the oppositely threaded ends of the shaft to cause the nuts 66 and 67 to move inwardly toward each other in their splined openings 64 and 65 respectively, this movement acting through washers 73 and 74 to contract the band ends 39 and 40 whereby the reverse drum 37 has its rotation checked for establishing the reverse drive through the transmission. When the shaft 70 is rotated in the opposite direction the nuts 66 and 67 are moved away from each other and the band 36 is expanded to permit the drum 37 to again rotate and thereby relieve the drive through the transmission controlling device 35.

In order to avoid repetition, we have not illustrated all of the details of the brake operating means associated with the controlling devices 32 and 33, it being understood that this operating means is similar to that described in connection with the controlling device 35. For convenience of reference the operating shaft or screw for the first speed braking device is designated as 70$^a$ and the corresponding shaft for the second speed braking device 33 is designated as 70$^b$ as best shown in Fig. 6. The segmental gear teeth associated with these shafts is respectively designated as 75$^a$ and 75$^b$. As will be more apparent presently the teeth 75, 75$^a$, 75$^b$ and 59 are adapted to be selectively operated in order to selectively control the engagement and release of the respective speed ratio controlling devices 35, 32, 33, and 34.

We will next describe the common operating means or actuating element which is adapted for selective engagement under manual control with the aforesaid gear segments 75, 75$^a$, 75$^b$ and 59 for respectively operating the speed ratio controlling devices 35, 32, 33 and 34 and also for establishing a neutral condition in the transmission. In the case of the third speed gear segment 59, the actuating element actually engages the single tooth segment 59$^a$ carried by a lever 59$^b$ pivotally supported (see Fig. 12) by a pin or shaft 59$^c$ journalled in bearings 59$^d$ carried by the casing 58. The inner end of lever 59$^b$ has a toothed segment 59$^e$ always meshing with the segment 59.

Referring now particularly to Figs. 6 and 10, the transmission side casing 60 is provided with a plurality of suitable bearings one of which is shown at 76 for receiving the reciprocating and oscillating rack or actuating shaft D.

This actuating shaft D has a series of teeth forming a rack adapted to be brought into operative association with each of the gear segments these racks being designated at 77, 78, 79 and 80. From Fig. 6 it will be noted that the racks are longitudinally spaced along the shaft D and that they are also spaced circumferentially of the shaft whereby upon progressive rotation of the shaft only one of the racks will engage its associated gear segment at any time. In Figs. 6 and 12 it will be noted that the shaft D is positioned so that the third speed rack 80 is in position for operating the third speed gear segments 59$^a$ and when the shaft D is moved to the right as viewed in Fig. 6 the lever 55 will be rocked by the intermediate lever 59$^b$ on its pivot 56 to move the clutch member 51 into clutching engagement with the third speed drum 50 to thereby cause the drive to take place through the transmission in the third gear ratio or direct drive. It will furthermore be noted that with the third speed rack 80 in the position illustrated, the remaining racks 77, 78 and 79 are free from engagement with their respective associated gear segments 75, 75$^a$ and 75$^b$. From Fig. 7 it will be noted that the shaft D has a space 81 longitudinally between the reverse rack 77 and the first speed rack 78, this space being designated as the neutral space so that when the shaft is positioned with the space 81 facing the gear segments (when shaft D is rotated approximately 180° from the position illustrated in Fig. 7) each of the racks will be free from contact with its associated gear segment and the transmission will be in neutral at which time the various braking devices 32, 33, 34 and 35 are released.

In order to selectively rotate the shaft D for selectively engaging the racks thereof with the respective gear segments and also for axially operating the shaft in the various positions of selective adjustment, the following mechanism is provided.

Forwardly adjacent the third speed rack 80, the rack D is provided with a circular rack or gear 82 meshing with the segmental rack 83 rotatable with a shaft 84 journalled in the casing member 85. The shaft 84 has fixed thereto, outwardly of the transmission casing, a lever 86 pivotally engaged by a rod 87 which, as best shown in Fig. 1, extends forwardly for pivotal connection at 88 with a lever 89 secured to a tubular shaft 90 which is rotatably journaled at its lower end by a support bracket 91 (see Figs. 4 and 5) suitably attached to the usual post 92 for the vehicle steering wheel 93. The hollow shaft 90 (see Figs. 2 and 3) extends upwardly adjacent the steering post to the manually controlled device E for selectively controlling or manipulating the transmission speed ratios as will be presently more apparent.

Figure 15:
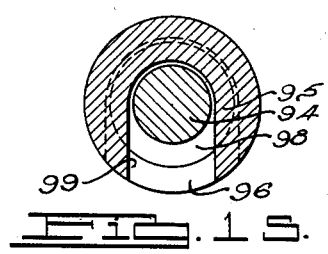
Fig. 15 is a detail sectional view along the line 15—15 of Fig. 10 showing the connection between the fluid operating piston and the selector rack shaft operated thereby.

Returning now to Fig. 10, the selector rack shaft D extends forwardly of the circular rack 82 and has an annular groove 94 adapted to receive the flange 95 of the fluid pressure operating piston 96 which reciprocates in the cylinder 97 formed in the casing. The piston 96 provides the actuating member of the power operating means G for moving shaft D under power to engage the brake bands. The rack shaft groove 94 provides the terminal shoulder 98 for shaft D, the piston flange 95 being open at 99 as best shown in Fig. 15 whereby the piston 96 may be readily attached to rack shaft D for movement as a unit therewith.

For yieldingly urging the rack shaft D to the left or forwardly to release the speed ratio controlling devices, we have provided prime mover means F preferably in the form of a compression coil spring 100 surrounding the forward end of rack shaft D and acting on piston 96 at the spring receiving annular recess 101 formed in the piston. The spring 100 has a fixed abutment provided by the abutment cup 102 anchored to the cylinder 97 by a spring ring 103.

The piston 96 has the flexible sealing cup 104 adapted to seal the piston against escape of the fluid rearwardly of the cylinder 97, the cup 104 bearing against the walls of the cylinder under the action of the fluid pressure introduced to the pressure chamber 105. The cup 104 is held in place by the forwardly extending piston shank 106 and the cup retaining member 107 carried thereby, the forward end of the cylinder being closed by a plug 108. Fluid, such as oil, under pressure is introduced to the pressure chamber 105 through a passage 109 leading to the valve controlled chamber or cylinder 110 which slidably receives the fluid pressure supply controlling valve 111. The cylinder 110 is supplied with oil under pressure through a passage 112 closed at one end by a plug 113 and receiving oil by a conduit 114 leading (see Fig. 6) to the delivery side of a suitable pump 115 herein illustrated as a well-known gear type pump. The pump is driven from its location in the oil storing sump of the transmission casing by the vertical shaft 116 having a gear 117 driven by a gear 118 fixed to the aforesaid driving sleeve or hub 29 of the fluid impeller 21.

The valve 111 has outer and inner cylinder bearing portions 119 and 120 respectively and an intermediate reduced portion 121 always in communication with the supply passage 112. A spring 122 yieldingly urges valve 121 outwardly tending to establish communication between supply and delivery passages 112 and 109. In the drawings, the parts are shown in their positions for operating the third or direct speed controlling device 34, the fluid pressure being cut off from chamber 105 by the valve portion 119 lying between passages 112 and 109 as shown in Fig. 11. When valve 111 moves outwardly under manual control by action of spring 122, the reduced valve portion 121 affords communication between passages 112 and 109 to supply fluid pressure from pump 115 to operate piston 96 and selector rack shaft D rearwardly for actuating one of the speed ratio controlling devices 32, 33, 34 or 35 depending on the rotative selective adjustment of selector rack shaft D as will be presently more apparent. With the valve 111 in the position of cut-off illustrated in Fig. 11, the pressure chamber 105 is vented to the oil sump, generally indicated at 123 in Fig. 11, by a passage 124 opening outwardly to a chamber 125 which in turn is open to cylinder 110, the valve having a cut away portion 126 which, in such position, affords communication between passage 109 and chamber 125. It will be understood that when valve 111 is moved inwardly compressing spring 122 to its fluid pressure supply position, the valve portion 119 closes communication between passage 109 and chamber 125.

The function and operation of the manually controlled selector mechanism E in relation to the selector rack shaft rotating means 83 and the rack reciprocating means G and F may now be further described.

Pivotally attached to the outer end of valve 111 by a pin 127 is the forked end 128 of a lever 129 (see Fig. 6) which is fixed to a pivot shaft 130, the shaft having also fixed thereto intermediate its ends a lever 131 having arms 132 and 133 respectively formed with or carrying an arcuate slot 134 and a pivot pin 135. The function of slot 134 will be presently referred to.

Slidably engaging pin 135 is the slot 136 of the end member 137 connected to Bowden wire mechanism 138. When wire 138 is moved rearwardly from the Fig. 6 position it will be apparent that spring 122 will act on valve 111 to move the latter outwardly, levers 129 and 131 swinging counterclockwise as far as permitted by the movement of slot 136.

The Bowden wire 138 (see Figs. 1-5) extends forwardly and upwardly through the hollow shaft 90 and through the axial passage 139 of the support member 140, the wire having an enlarged upper end 141. The member 140 is fixed to shaft 90 at 142 and passes through the bottom wall or floor 143 of the hollow casing 144, the latter encircling the steering post 92 for support and being attached thereto as at 145. The member 140 has a casing portion 146 shouldered to seat on floor 143, the upper end of shaft 90 bearing on the outer face of floor 143. The portion 146 has laterally projecting pins 147 pivoting the inner forked end of a selector arm or lever 148 which projects outwardly through the casing opening 149 to provide a hand grasping end 150 within convenient reach of the operator.

The floor 143 carries an arcuate strip 151 having a series of holes 152, 153, 154, 155 and 156 adapted to selectively receive the downwardly extending lever finger 157 whereby lever 148 may be selectively positioned for first speed, second, direct, neutral and reverse. In Fig. 2 these speed positions are abbreviated as 1, 2, 3, N and R.

Mounted on lever 148 by a bracket 158 is a lever 159 pivoted at 160 to the bracket and adapted for movement with and relative to the selector arm 148 within casing 144. The inner end of lever 159 has an opening 161 through which the Bowden wire 138 projects, the aforesaid enlarged end 141 seating on the upper face of lever 159. The outer end of lever 159 slidably bears against the under arcuate face of an abutment member 162 secured at 163 to casing 144, a spring 164 acting between levers 148 and 159 tending to separate these levers at the spring seats thereon. Lever 149 has a pointer 165 cooperating with the aforesaid speed indicating markings on the casing to readily advise the operator of the desired registration of finger 157 with the holes of strip 151.

In operation of the selector mechanism E, for changing the transmission speed ratio, the operator first lifts lever 148 to disengage finger 157 from one of the holes of plate 151, the outer end of lever 159 striking abutment 162 causing lever 159 to swing about pivot 160 compressing spring 164 and pulling Bowden wire 138 upwardly at the end 141 thereof. This position of parts is illustrated in Fig. 3, lever 148 having moved from the dotted line position 148'. When wire 138 is thus pulled, levers 131 and 129 (see Fig. 6) are swung clockwise, moving valve 111 inwardly to compress spring 122 (see Fig. 11) and vent chamber 105. At such time the spring 100 moves selector rack shaft D forwardly releasing whichever one of the speed ratio controlling devices was in operation prior to lifting the selector arm 148. It will be understood that if the selector arm was engaged with the neutral hole 155 prior to the aforesaid lifting operation, then the selector rack shaft D will move forwardly without operating during such movement to release any of the controlling devices 32 to 35, such devices having been already released in such instance.

After lifting arm 148 to the Fig. 3 position the operator may now release the lever to again restore the previous setting although ordinarily when arm 148 is lifted a new condition of setting of the transmission is desired. Therefore, while holding the arm 148 raised, the operator then swings the arm to the desired new setting. Assuming for illustration that direct speed is now desired, the operator swings lever 148 to align indicator 165 with "3" and then releases the arm to engage finger 157 with the third speed hole 154. In order to illustrate a typical condition, our drawings show the parts just prior to release of arm 148 for obtaining this direct drive.

When arm 148 is swung as aforesaid, the arm pivots about the axis of shaft 90 and member 140, rotating shaft 90. Rotation of this shaft operates through link 87 and segment 83 to rotate the selector rack D relative to piston 96 to bring the third speed rack into mesh with tooth 59ª of the operating mechanism for the clutch 51. It might be stated more clearly at this point that if any other setting of arm 148 had been made, the corresponding rack 77, 78 or 79 would have been meshed with the corresponding segmental gears 75, 75ª or 75ᵇ but only one at a time. Likewise if neutral had been selected all segmental gears including the third speed tooth 59ª would be free of the selector rack teeth, space 81 (see Fig. 7) being presented toward the segmental gears, whereby rearward movement of the rack under fluid pressure operation would not actuate any of the speed ratio controlling devices.

Returning now to the aforesaid illustrative operation and with arm 148 swung to the third speed position, the operator now releases the arm under the influence of spring 164 whereby the valve spring 122 moves valve 111 outwardly operating through levers 129 and 131 to pull Bowden wire end 141 downward, the inner end of lever 159 resting on the top of member portion 146 (see Fig. 3). Outward movement of valve 111 admits fluid pressure from the pump 115 to act on piston 96 to move the selector rack shaft D rearward and engage the clutch 51 of the third speed device 34. The motor vehicle is now driven in third speed, the fluid clutch B smoothly adjusting the engine A to the new driving conditions without shock or jolt.

The motor vehicle may be driven in direct as long as desired, the fluid pressure on piston 96 maintaining the selector rack shaft D rearward against the compression of spring 100.

When a new gear ratio is desired the operator merely lifts arm 148 to release the third speed device 34 by reason of the release of fluid pressure on piston 96 whereby selector rack shaft D moves forwardly by spring power, the arm 148 being swung to a new position to selectively rotatably adjust the selector rack shaft D. When arm 148 is released, the pressure is restored to operate the selector rack shaft D and the newly selected speed ratio controlling device or else a neutral condition of no drive.

While the operating mechanism aforesaid may be used without our auxiliary controlling devices, we preferably provide one or both of such devices, especially where fluid pressure is used to operate the selector operating rack shaft D.

Referring first to the auxiliary manual controlling means for operating at least one of the speed ratio controlling devices independently of the fluid pressure supply and preferably also independent of the selector rack shaft D, we have illustrated such auxiliary or supplemental control in the form of a hand operated hand 166 (see Fig. 1) conveniently located at the usual instrument board or dash panel 167 of the driver's compartment. However, the manual control 166 may be foot operated and located at any desired position of access as will be readily understood. The handle 166 is preferably adapted to control the third speed controlling device 34 and to this end (see Fig. 6) the aforesaid lever abutment 55$^b$ forms the lower arm of a lever 168 pivotally supported at 169 and normally held against an adjustable abutment 170 by a spring 171.

Secured to lever 168 is a Bowden wire 172 extending forwardly and upwardly for attachment to the plunger portion 173 of handle 166. Plunger 173 is slidably mounted in a dash bracket 174 provided with spaced notches 175, 176 adapted for selective registration with a detent 177 yieldingly urged toward the notches by a leaf spring 178. The plunger 173 has an axial bore 179 slidably receiving a latch operating rod 180 which extends rearwardly from handle 166 to provide a button end 181, a spring 182 urging rod 180 rearwardly to the Fig. 1 position.

Detent 177 has an opening 183 adapted to slidably receive rod 180 when aligned with bore 179, the rod having a forwardly bevelled end 184 projecting into opening 183. Rod 180 has its movements limited by a screw stop 185 operating against the ends of a slot 186.

With the parts positioned as shown in Fig. 1 and assuming that the operator desires to effect a direct drive through the transmission independently of the mechanism operated by the fluid pump 115, the button 181 is first pushed to cause rod 180 to release detent 177 from notch 175, handle 166 then being pulled while releasing button 181 until detent 177 enters notch 176.

Pulling handle 166 operates through the Bowden wire 172 to swing lever 168 on its pivot 169 and thereby operate lever extension 55$^a$ to engage the third speed cone clutch 51 for the desired direct drive through the transmission. If the selector arm 148 is positioned at third speed (assuming the pump pressure system to have failed for some reason) the effort at handle 166 in overcoming spring 100 may be obviated by first adjusting arm 148 to any other of its positions whereby tooth 59$^a$ will clear the third speed rack 80 of the selector rack shaft D.

The arm 148 is preferably adjusted to its neutral position prior to operation of the handle 166 since, in such event, the auxiliary control can then operate entirely independently of the main system regardless of whether or not the main system is in operating condition.

When it is desired to release the auxiliary third speed drive, the operator pushes button 181 to release the detent 177 followed by a pushing of handle 166 to restore the parts to the positions indicated in Figs. 1 and 6.

Referring now to our auxiliary manually controlling means for the fluid pressure supply to selector rack operating means G, we have provided means for actuating the valve 111 independently of actuation thereof in response to movement of the selector arm 148. We preferably provide a manually operable element in the form of a foot pedal which may be arranged adjacent the conventional brake pedal and substituted for the conventional clutch pedal of conventional vehicles. By providing a fluid type clutch B, the use of a clutch pedal is of course rendered unnecessary and we prefer to use the conventional clutch pedal location for our auxiliary fluid pressure supply control. While such control may be hand operated or at any convenient point for manual operation by foot or by hand, our above suggested location is of advantage in that a driver accustomed to depressing a clutch and a brake pedal to release the engine drive and stop the vehicle may follow this practice to accomplish the same result with our transmission control arrangement.

Referring particularly to Figs. 1, 1A and 6 a portion of the usual motor vehicle toe board is illustrated at 187 supporting the usual engine accelerator pedal 188 and the customary brake pedal 189. The conventional clutch pedal is replaced (or used for our novel purpose) by a pedal 190 pivoted at 191 to one arm of the bell crank lever 192 which is pivotally supported at 193. The other arm of lever 192 pivotally operates a link 194 which (see Fig. 6) has its rearwardly extending end operating in the arcuate slot 134 of lever arm 132.

In operation, when pedal 190 is depressed the link 194 is thrust rearwardly to actuate lever 131 and move valve 111 inwardly to vent the chamber 105 and allow spring 100 to move the selector rack shaft D forwardly to release any speed ratio controlling device which may have been in condition of operation in effecting a drive through the transmission. Thus, the effect of depressing the pedal 190 is to release any drive without disturbing the position of selector arm 148. On release of pedal 190, spring 122 acts to restore valve 111 and pedal 190, the fluid pressure acting on piston 96 to restore any speed ratio drive which may have been in operation assuming, of course, that the operator does not manipulate selector arm 148 into a new setting of speed ratio drive or neutral between the movements of actuation and release of pedal 190. Obviously, the selector rack shaft D will respond to a new setting while pedal 190 is depressed.

In Fig. 6 it will be remembered that the parts are illustrated for the Fig. 3 position of arm 148 wherein the arm is ready for downward release to permit valve spring 122 to move lever 131 counterclockwise so that normally the rear end of link 194 will be in a position at the rear end of slot 134 ready to move lever 131 as soon as pedal 190 is depressed. In such normal position movement of lever 131 and valve 111 by arm 148 may be brought about independently of its movement by pedal 190 and vice versa. It will be understood that control of the transmission may be normally effected without operation of pedal 190.

In order to limit rotation of the various screw shafts 70, 70ª and 70ᵇ when the shaft D is operated forwardly in releasing the respective braking devices 35, 32 and 33 and to thereby maintain proper alignment for entry of the teeth of racks 77, 78, and 79 with the respective segmental gears 75, 75ª and 75ᵇ, each of the aforesaid screw shafts is provided with a downward extension 195 illustrated in Figs. 7 and 8. Carried by the side casing 60 are a plurality of adjustable set screws 196 with associated lock nuts 197. Each extension 195 carries a lever 198 engaging a screw 196 when rack shaft D moves entirely forwardly. During the forward releasing movement of shaft D, whichever of the screw shafts 70, 70ª or 70ᵇ is engaged with shaft D is rotated substantially ninety degrees to move its lever 198 clockwise as viewed in Fig. 8 away from its associated screw 196.

When either of the screw shafts is operated by rearward movement of shaft D to rotate any of the screw shafts in a counterclockwise direction as viewed in Fig. 8, the lever 198 of such screw shaft is rotated through substantially ninety degrees into limiting contact with a screw 196. In this manner proper alignment is maintained between the racks 77, 78 and 79 with the teeth of the associated segmental gears 75, 75ª and 75ᵇ respectively. The adjustment 170 for lever abutment 55ᵇ serves a similar purpose for the third speed tooth 59ª. A removable bottom cover plate 60ᶜ removably secured to the transmission casing by fasteners 60ᵈ provides convenient access to screws 196.

Figure 14:
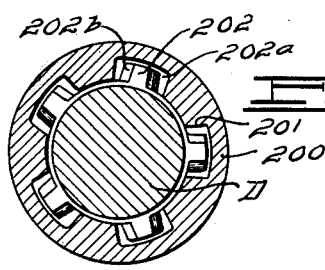
Fig. 14 is a detail sectional view along the line 14—14 of Fig. 6 illustrating the selector rack shaft aligning means.

In order to prevent any possibility of the shaft D being moved rearwardly to engage more than one of the racks thereof with the respectively associated segmental gears for operating the various braking devices, and also for maintaining the desired alignment of the shaft D with respect to the associated segmental gears operated thereby we have provided the mechanism illustrated in Figs. 6 and 14. The shaft D has a bearing portion 199 adjacent the rear end of the rack 77, this bearing portion being slidable through a fixed bushing 200 formed with a series of circumferentially spaced, longitudinally extending splines or slots 201.

These slots receive corresponding projections or splines 202 of shaft D whenever the shaft is properly rotatably adjusted to actuate only one of the segmental gears of the speed ratio controlling devices or for neutral.

A small clearance 202ª (see Fig. 14) is provided between splines 200 and slots 201 within the limits of rotation of shaft D for engaging only one rack and segmental gear at a time, the clearance 202ª facilitating operation of shaft D for very minor inaccuracies in rotative adjustment of the shaft. To facilitate entry of the shaft splines 202 into grooves 201 to correct any improper rotative shaft adjustment which may occur unless such shaft adjustment is too much in error as may occur by improper tampering with the mechanism or through breakage of some part, the leading side faces of splines 202 may be bevelled at 202ᵇ to permit entry of the splines into the grooves by imparting a corrective rotation to the shaft D.

In order to adjust the clearance of any brake band 36 with its drum 37 so that each brake lining 38 may properly engage its drum 37 without requiring undue rearward movement of shaft D we have provided the adjusting means illustrated in Figs. 7 and 9. This adjusting means also provides a convenient method of taking up excessive band wear at any braking device. It will be understood that band wear will be slight since the brake bands grip quickly without much slippage, the fluid clutch B providing the momentary slippage during speed ratio changes.

The spline for each nut 66 is provided by an inverted U-shaped clip 203 which is adapted to engage diametrically aligned slots 204 of a nut 66 and also a pair of slots 205 or 206 of the bracket opening 64. These slots 205 and 206 are arranged in relation to slots 204 so that a relative rotative adjustment between nut 66 and opening 64 may be provided for rotation of the nut equal to half the distance between adjacent slots 204 as will be readily apparent from Fig. 9. A top cover plate 60ª removably attached to the transmission casing by fasteners 60ᵇ provides convenient access to effect the adjustment of the U-shaped members 203.

The forward releasing movement of rack shaft D is limited by the adjustable plug 108 while the rearward operating stroke of shaft D is limited by engagement of one of the bands 38 with a drum 37 or by engagement of the third speed cone 51 with its drum 50. The rearward stroke of shaft D in the case of a neutral setting, or in other instances where excessive band wear may have occurred without adjustment, the shaft is limited in its movement by engagement of piston 96 with the spring abutment cup 102.

Various modifications and changes will be apparent from the teachings of our invention, as set forth in the appended claims, and it is not our intention to limit our invention to the particular details of construction and operation shown and described for illustrative purposes.

What we claim is:

1. In a motor vehicle planetary gear transmission having a plurality of speed ratio controlling braking devices, means operably associated with each of said controlling braking devices for actuating said braking devices, an adjustable operating element adapted for selective operative connection with said actuating means for applying braking force selectively to said controlling braking devices, means for mounting said operating element for reciprocation along and for rotation about a common axis, manually operated means for selectively rotatably adjusting said operating element, a plurality of prime mover power operating means, one of which includes a spring, for actuating said operating element in its opposite directions of reciprocatory movement respectively, and manually operated means for controlling the operation of each of said power operating means.

2. In a motor vehicle transmission having a plurality of speed ratio controlling devices, means operably associated with each of said controlling devices for actuating said devices, an adjustable rack shaft adapted for selective aperative connection with said actuating means for said controlling devices, said rack shaft having a plurality of groups of rack gear teeth arranged longitudinally thereof, each of the actuating means for said controlling devices including a gear toothed member adapted for engagement with the teeth of one of said groups of rack teeth, manually operated means for selectively adjusting said rack shaft, and power operating means for reciprocating said rack shaft, said power operating means including a spring for moving said rack in one of its reciprocating directions of movement.

3. In a motor vehicle transmission having a plurality of speed ratio controlling devices, means including a gear toothed member operably associated with each of said controlling devices for actuating said devices, an adjustable shaft having a plurality of groups of rack gear teeth respectively adapted for selective operative connection with the gear toothed members of said actuating means for said controlling devices, manually operated means for adjusting said shaft for selectively operably connecting said groups of rack teeth respectively with the gear toothed members of said actuating means, and power operating means including a spring for actuating said shaft.

4. In a motor vehicle transmission having a plurality of speed ratio controlling devices, means including a gear toothed member operably associated with each of said controlling devices for actuating said devices, an adjustable shaft having a plurality of groups of rack gear teeth respectively adapted for selective operative connection with the gear toothed members of said actuating means for said controlling devices, manually operated means for rotating said shaft for selectively operably connecting said groups of rack teeth respectively with the gear toothed members of said actuating means, and power operating means for axially reciprocating said shaft including fluid pressure means for moving said shaft axially in one direction and spring means for axially moving said shaft in its opposite direction.

5. In a motor vehicle transmission having a plurality of speed ratio controlling devices, means including a gear toothed member operably associated with each of said controlling devices for actuating said devices, an adjustable shaft having a plurality of groups of rack teeth respectively adapted for selective operative connection with the gear toothed members of said actuating means for said controlling devices, manually operated means for adjusting said shaft for selectively operably connecting said groups of rack teeth respectively with the gear toothed members of said actuating means, and power operating means including a spring for moving said shaft.

6. In a motor vehicle transmission having a plurality of speed ratio controlling devices, means operably associated with each of said controlling devices for actuating said devices, an adjustable operating element adapted for selective operative connection with said actuating means, said controlling devices, fluid pressure operating means for operating said operating element in its positions of selective adjustment thereby to selectively provide speed ratio drives through the transmission, manually controlled selector means for controlling said fluid pressure operating means and for adjusting said operating element selectively to its positions of adjustment subsequently to said control of said fluid pressure operating means, and power operating means for actuating said operating element in opposition to said fluid pressure operating means.

7. In a motor vehicle transmission of the planetary gear type having a plurality of speed ratio controlling braking devices, power operated means for selectively operating said controlling braking devices, and manually operated means for selectively controlling operation of said controlling braking devices by said power operated means, a spring, said manually operated means including a rack shaft operated by said spring and being adjustable to selectively establish an operating connection between said power operated means and said controlling braking devices.

8. In a motor vehicle transmission having a plurality of speed ratio controlling devices, power operated means for selectively operating said controlling devices, and manually operated means for selectively controlling operation of said controlling devices by said power operated means, said manually operated means including a rack shaft adjustable to selectively establish an operating connection between said power operated means and said controlling devices, said rack shaft having a plurality of groups of rack gear teeth for respectively operating said controlling devices, said power operated means acting through said rack shaft to selectively operate said controlling devices, and a spring acting in opposition to said power operated means.

9. In a motor vehicle transmission having a plurality of speed ratio controlling devices, fluid power operated means for selectively operating said controlling devices to provide selective speed ratio drives through the transmission, an adjustable element adapted to selectively establish an operating connection between said fluid power operated means and said controlling devices, and manually operated selector means for adjusting said adjustable element selectively to its positions of adjustment subsequently to exercising a control on said fluid power operated means.

10. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, an adjustable rack shaft adapted for selective operative connection with said actuating means, manually operated means for selectively adjusting said rack shaft, and power operating means including a spring for actuating said rack shaft.

11. In a motor vehicle planetary transmission having a plurality of speed ratio planetary gear trains and rotary controlling drums associated therewith, braking means for resisting rotation of each of said drums, means including a gear associated with each of said braking means and adapted to actuate the respective braking means, an adjustable shaft having a plurality of racks respectively adapted for selective operative connection with said actuating means, manually operated means for rotatably adjusting said shaft to selectively engage said racks with said gears respectively, and power operating means including a spring and a fluid pressure device for alternately reciprocating said shaft to selectively actuate and release said braking means.

12. In a motor vehicle planetary transmission having a plurality of speed ratio planetary gear trains and rotary controlling drums associated therewith, braking means for resisting rotation of each of said drums, a shaft for each of said braking means, each of said shafts having oppositely threaded portions, means threadedly connected to said threaded portions of each of said shafts and adapted on rotation of said shafts to actuate the braking means respectively associated therewith, power operating means including a fluid pressure device and a spring for alternately actuating said shafts, and manually operated means for selectively controlling actuation of said shafts by said power means.

13. In a motor vehicle planetary transmission having a plurality of speed ratio planetary gear trains and rotary controlling drums associated therewith, braking means for resisting rotation of each of said drums, a shaft for each of said braking means, each of said shafts having oppositely threaded portions, means threadedly connected to said threaded portions of each of said shafts and adapted on rotation of said shafts to actuate the braking means respectively associated therewith, a gear carried by each of said shafts, an adjustable rack shaft adapted for selective operable connection to said gears, manually controlled selector means for selectively adjusting said rack shaft, and power means for actuating said rack shaft in its positions of adjustment for selectively operating said braking means, said selector means including a manually actuable control element adapted to adjust said rack shaft and to also control the operation of said power means.

14. In a motor vehicle transmission having a plurality of speed ratio controlling devices, selector operating means for actuating said devices, power operating means including a valve controlled fluid pressure device for operating said selector operating means, and a plurality of independently operable manual controlling means for actuating said valve to control the operation of said fluid pressure device.

15. In a motor vehicle transmission of the planetary gear type having a plurality of speed ratio controlling braking devices, means operably associated with each of said controlling devices for actuating said devices, an adjustable operating element adapted for selective operative connection with said actuating means for said controlling devices, manually controlled means for selectively adjusting said operating element, a cylinder, a piston operating in said cylinder, means operably connecting said piston and said operating element, means for admitting a fluid under pressure to said cylinder for causing said piston to actuate said operating element in one direction of movement thereof to selectively apply said controlling braking devices, and spring means for restoring said piston to thereby actuate said operating element in a direction substantially opposite to that aforesaid to release said controlling braking devices.

16. In a motor vehicle transmission having a plurality of speed ratio controlling devices, means including a rotatable and reciprocating shaft for selectively operating said devices, said shaft having a plurality of circumferentially and axially spaced members carried thereby for respectively actuating said devices, means for selectively rotating said shaft to adjust said members thereof into position for actuating said devices respectively, means for reciprocating said shaft in its said positions of rotative adjustment, and safety means insuring proper rotative positioning of said shaft to prevent a plurality of said shaft members from actuating a plurality of said devices at any one time during an axial movement of said shaft, said shaft means including a guide having a shaft receiving portion, said shaft having a portion thereof adapted to alternately enter and clear said guide portion during reciprocation of said shaft, one of said portions having a plurality of slots and the other having a plurality of projections registerable with said slots when said shaft is properly rotatably positioned as aforesaid.

17. In a motor vehicle transmission having a plurality of planetary gear sets and associated rotary control elements adapted to be braked, braking means for said rotary elements, means including a power operator for actuating said braking devices, means effecting selective operating connection between said power operating means and said braking means, and manually operable controlling means for said selective connecting means and said power operating means, said manually operable means including a selector lever mounted for successive swinging movements in a plurality of different directions whereby to successively control said power operating means and said selective connecting means in effecting the release of one of said braking means and the actuation of another.

18. In a motor vehicle transmission having a plurality of planetary gear sets and associated rotary control elements adapted to be braked, braking means for said rotary elements, means including a power operator for actuating said braking devices, means effecting selective operating connection between said power operating means and said braking means, and manually operable controlling means for said selective connecting means and said power operating means, said manually operable means including a selector lever mounted for successive swinging movements in a plurality of different directions whereby to successively control said power operating means and said selective connecting means in effecting the release of one of said braking means and the actuation of another, said manually operable controlling means further including a second lever pivotally mounted on said selector lever and adapted for pivotal movement in response to one of said swinging movements of said selector lever.

19. In a planetary transmission having a plurality of planetary gear sets and controlling devices therefor, manually controlled means for selectively operating said controlling devices, and auxiliary manually controlled means for operating at least one of said devices independently of the first said manually controlled means, said auxiliary means including a manually operable element and operating connections between said element and one of said devices, yielding means opposing operation of said manually operable element, and latch means for releasably holding said manually operable element in its operative position, said yielding means acting to move said manually operable element to its inoperative position when said latch means is released.

20. In a power transmission having a plurality of speed ratio controlling devices, an adjustable selector element adapted for movement between a plurality of stations to control selective operation of said devices, means for mounting said element for multiple directional movement when said element is adjusted from one of said stations to another, power operating means for selectively operating said devices, selector operating means providing selective operative connection between said power operating means and said devices, means for effecting operation of one of said operating means in response to movement of said element in one of said multiple directional movements, and means for effecting operation of the other of said operating means in response to movement of said element in another of said multiple directional movements.

21. In a power transmission having a plurality of speed ratio controlling devices, an adjustable selector element adapted for movement between a plurality of stations to control selective operation of said devices, means for mounting said element for multiple directional movement when said element is adjusted from one of said stations to another, power operating means for selectively operating said devices, selector operating means providing selective operative connection between said power operating means and said devices, and a plurality of means operably connected to said element for respectively effecting operation of said power operating means and said selector operating means in response to movement of said element from one of said stations to another.

22. In a power transmission having a plurality of speed ratio controlling devices, an adjustable selector element adapted for movement between a plurality of stations to control selective operation of said devices, means for mounting said element for multiple directional movement when said element is adjusted from one of said stations to another, fluid pressure operating means for operating said devices, selector operating means providing selective operative connection between said power operating means and said devices, valving means controlling fluid pressure supply to said fluid pressure operating means, means for effecting operation of one of said operating means in response to movement of said element in one of said multiple directional movements, and means for effecting operation of the other of said operating means in response to movement of said element in another of said multiple directional movements.

23. In a power transmission having a plurality of speed ratio controlling devices, an adjustable selector element adapted for movement between a plurality of stations to control selective operation of said devices, means for mounting said element for multiple directional movement when said element is adjusted from one of said stations to another, fluid pressure operating means for operating said devices, selector operating means providing selective operative connection between said power operating means and said devices, valving means controlling fluid pressure supply to said fluid pressure operating means, and a plurality of means operably connected to said element for respectively effecting operation of said valving means and said selector operating means in response to movement of said element from one of said stations to another.

24. In a power transmission having a plurality of speed ratio controlling devices, an adjustable selector element adapted for movement between a plurality of stations to control selective operation of said devices, means for mounting said element for multiple directional movement when said element is adjusted from one of said stations to another, power operating means for selectively operating said devices, selector operating means providing selective operative connection between said power operating means and said devices, means for effecting operation of one of said operating means in response to movement of said element in one of said multiple directional movements, means for effecting operation of the other of said operating means in response to movement of said element in another of said multiple directional movements, and a spring opposing operation of said power operating means.

25. In a power transmission having a plurality of speed ratio controlling devices, an adjustable selector element adapted for movement between a plurality of stations to control selective operation of said devices, fluid power operating means for selectively operating said devices to provide selective speed ratio drives through the transmission, an adjustable selector operating member adapted to selectively provide an operating connection between said fluid power operating means and each of said devices, and means responsive to movement of said selector element from one of said stations to another to control said fluid power operating means and to selectively adjust said operating member.

26. In a power transmission having a plurality of speed ratio controlling devices, an adjustable selector element adapted for movement between a plurality of stations to control selective operation of said devices, fluid power operating means for selectively operating said devices, an adjustable selector operating member adapted to selectively provide an operating connection between said fluid power operating means and each of said devices, and means responsive to movement of said selector element from one of said stations to another to selectively adjust said operating member and thereafter effect an operating control on said fluid power operating means.

27. In a power transmission having a plurality of speed ratio controlling devices, an adjustable selector element adapted for movement between a plurality of stations to control selective operation of said devices, fluid power operating means for selectively operating said devices, an adjustable selector operating member adapted to selectively provide an operating connection between said fluid power operating means and each of said devices, and means responsive to movement of said selector element from one of said stations to another to first release operation of said fluid power operating means and then to selectively adjust said operating member and restore operation of said fluid power operating means.

28. In a power transmission of the planetary gear type having a plurality of speed ratio controlling braking devices for selectively establishing variable drives through planetary gear trains, an adjustable selector element adapted for movement between a plurality of stations to control selective operation of said braking devices, means for mounting said element for multiple directional movement when said element is adjusted from one of said stations to another, power operating means for selectively applying braking force to said braking devices, selector operating means providing selective operative connection between said power operating means and said braking devices, means for effecting operation of one of said operating means in response to movement of said element in one of said multiple directional movements, and means for effecting operation of the other of said operating means in another of said multiple directional movements.

29. In a power transmission of the planetary gear type having a plurality of speed ratio controlling braking devices for selectively establishing variable drives through planetary gear trains, an adjustable selector element adapted for movement between a plurality of stations to control selective operation of said braking devices, fluid power operating means for selectively operating said braking devices, an adjustable selector operating member adapted to selectively provide an operating connection between said fluid power operating means and each of said devices, and means responsive to movement of said selector element from one of said stations to another to release said fluid power operating means and to selectively adjust said operating member.

30. In a motor vehicle planetary gear transmission having a plurality of speed ratio controlling braking devices for the planetary gear trains of the transmission, selector operating means for applying braking force selectively to said devices, power operating means including a valve controlled fluid pressure device for operating said selector operating means, and a plurality of independently operable manually controlling means for actuating said valve to control the operation of said fluid pressure device.

31. In a motor vehicle planetary gear transmission having a plurality of speed ratio controlling braking devices for the planetary gear trains of the transmission, selector operating means for applying braking force selectively to said devices, power operating means including a valve controlled fluid pressure device for operating said selector operating means, and a plurality of independently operable manually controlling means for actuating said valve to control the operation of said fluid pressure device, one of said plurality of manually controlling means including a manually adjustable selector controlling element, and further including means for adjusting said selector operating means in response to adjustment of said selector controlling element.

32. In a power transmission having a plurality of speed ratio controlling devices, an adjustable selector element adapted for movement between a plurality of stations to control selective operation of said devices, means for mounting said element for multiple directional movement when said element is adjusted from one of said stations to another, fluid pressure operating means for operating said devices, selector operating means providing selective operative connection between said power operating means and said devices, valving means controlling fluid pressure supply to said fluid pressure operating means, and a plurality of means operably connected to said element for respectively effecting operation of said valving means and said selector operating means in response to movement of said element from one of said stations to another, and manually controlled means for operating said valving means independently of the operation thereof in response to said movement of the adjustable selector element.

33. In a motor vehicle transmission of the planetary gear type having a plurality of planetary gear operated rotary elements and associated controlling devices adapted to provide a plurality of speed ratio drives differing from a direct drive through the transmission, clutching means providing a direct drive through the transmission, a lever for operating said clutching means, means providing a pivotal support for said lever, manually controlled power operating means for selectively operating said controlling devices and for actuating said lever to operate said clutching means to vary the speed ratio drive through the transmission, and auxiliary manually controlled means for actuating said lever to operate said clutching means to provide said direct drive through the transmission independently of the operation of said clutching means by said manually controlled power operating means.

34. In a motor vehicle transmission of the planetary gear type having a plurality of planetary gear operated rotary elements and associated controlling devices adapted to provide a plurality of speed ratio drives differing from a direct drive through the transmission, clutching means providing a direct drive through the transmission, a lever for operating said clutching means, a manually adjustable selector element, power operating means responsive to adjustment of said selector element for selectively operating said controlling devices and for actuating said lever to operate said clutching means to vary the speed ratio drive through the transmission, and manually controlled operating means for actuating said lever to operate said clutching means independently of said operation of said clutching means in response to manual adjustment of said selector element.

35. In a motor vehicle transmission of the planetary gear type having a plurality of planetary gear operated rotary elements and associated controlling devices adapted to provide a plurality of speed ratio drives through the transmission, a selector operating element, manually controlled power operating means for selectively operating said controlling devices through the intermediary of said selector operating element, and auxiliary manually controlled means for operating one of said controlling devices independently of said manually controlled power operating means.

36. In a motor vehicle transmission having a plurality of speed ratio controlling devices, fluid power operating means, an operating member adjustable to positions of selective operative connection with said controlling devices and movable by said fluid power operating means in said positions of adjustment to operate a selected controlling device thereby to provide selective speed ratio drives through the transmission, a controlling element manually adjustable to a plurality of stations of transmission control, and means responsive to manual adjustment of said controlling element for adjusting said operating member and for exercising a control on said fluid power operating means.

37. In a motor vehicle planetary transmission having a plurality of planetary gear trains and associated rotary control elements, braking means for each of said control elements, fluid power operating means for selectively applying said braking means, an operating member adjustable to positions of selective operative connection with said braking means and movable by said fluid power operating means in said positions of adjustment to transmit braking force to a selected braking means, a controlling element manually adjustable to a plurality of stations of transmission control, and means responsive to manual adjustment of said controlling element for adjusting said operating member and for exercising a control on said fluid power operating means.

38. In a motor vehicle planetary transmission having a plurality of planetary gear trains and associated rotary control elements, braking means for each of said control elements, fluid power operating means for selectively applying said braking means, an operating member adjustable to positions of selective operative connection with said braking means and movable by said fluid power operating means in said positions of adjustment to transmit braking force to a selected braking means, second power operating means adapted to return said operating member after movement thereof by the first said power operating means for releasing a previously applied braking means, a controlling element manually adjustable to a plurality of stations of vehicle driving transmission control, and means responsive to manual adjustment of said controlling element for adjusting said operating member and for controlling the operation of both of said power operating means.

39. In an engine driven motor vehicle, a planetary gear transmission having a plurality of rotary control elements and associated engaging devices, a selector element manually adjustable to a plurality of predetermined stations of transmission control, means including a prime mover acting in response to manual adjustment of said selector element for selectively operating said engaging devices to effect a change in the transmission speed ratio, a manually operable control member, and means responsive to manual operation of said control member for controlling the operation of said prime mover for releasing all of said engaging devices independently of manual adjustment of said selector element from any of its said stations.

40. In an engine driven motor vehicle, a planetary gear transmission having a plurality of rotary control elements and associated engaging devices, a selector element manually adjustable to a plurality of predetermined stations of transmission control, means responsive to manual adjustment of said selector element for selectively operating said engaging devices to effect a change in the transmission speed ratio, a pedal, and means responsive to operation of said pedal for releasing any selected engaging device from its associated rotary control element independently of manual adjustment of said selector element from any of its said stations.

41. In a motor vehicle transmission having a plurality of gear trains and associated rotary elements, a plurality of devices respectively frictionally engageable with said rotary elements for controlling the drives through the transmission, a manually adjustable selector element movable to a plurality of predetermined stations of transmission control, means responsive to said movement of said selector element for causing selective engagement of said devices with said rotary elements respectively, an operator-controlled actuating member, and means responsive to actuation of said operator-controlled member for effecting disengagement of any of said devices which may then be in engagement with one of said rotary elements as determined by the station setting of said selector element.

42. In a motor vehicle transmission having a plurality of gear trains and associated rotary elements, a plurality of devices respectively frictionally engageable with said rotary elements for controlling the drives through the transmission, a manually adjustable selector element movable to a plurality of predetermined stations of transmission control, means including a fluid pressure operating device for effecting selective engagement of said devices respectively with said rotary elements in response to said movement of said selector element, an operator-controlled actuating member, and means responsive to actuation of said operator-controlled actuating member for venting said fluid pressure device to effect disengagement of any of said frictionally engaging devices which may then be in engagement with one of said rotary elements as determined by the station setting of said selector element.

43. In a motor vehicle transmission having a plurality of gear trains and associated rotary elements, a plurality of devices respectively frictionally engageable with said rotary elements for controlling the drives through the transmission, a manually adjustable selector element movable to a plurality of predetermined stations of transmission control, a selector operating rack adjustable to positions of selective operative connection with frictionally engageable devices, fluid pressure means for operating said rack in its said positions of adjustment, and means responsive to adjustment of said selector element from one of said stations to another for adjusting said rack and for controlling operation of said fluid pressure means.

44. In a motor vehicle transmission having a plurality of gear trains and associated rotary elements, a plurality of devices respectively frictionally engageable with said rotary elements for controlling the drives through the transmission, a manually adjustable selector element movable to a plurality of predetermined stations of transmission control, a selector operating rack adjustable to positions of selective operative connection with frictionally engageable devices, fluid pressure means for operating said rack in its said positions of adjustment, motion-transmitting means operably connecting said selector element with said rack for selectively adjusting said rack in response to said station adjustments of said selector element, and means for controlling operation of said fluid pressure means in response to said station adjustments of said selector element.

45. In a motor vehicle transmission having a plurality of gear trains and associated rotary elements, a plurality of devices respectively frictionally engageable with said rotary elements for controlling the drives through the transmission, a manually adjustable selector element movable to a plurality of predetermined stations of transmission control, a selector operating rack adjustable to positions of selective operative connection with frictionally engageable devices, fluid pressure means for operating said rack in its said positions of adjustment, an oil pressure pump for delivering oil under pressure to said fluid pressure means, a valve controlling said oil pressure delivery, and means responsive to said station adjustments of said selector element for adjusting said rack and for operating said valve.

46. In a motor vehicle transmission having a plurality of gear trains and associated rotary elements, a plurality of devices respectively frictionally engageable with said rotary elements for controlling the drives through the transmission, power operating means for selectively operating said devices, selector means adapted for manipulation to selectively provide operating connections between said power operating means and each of said devices, a manually adjustable selector element movable to a plurality of predetermined stations of transmission control, means for mounting said selector element for movements in directions approximately at right angles with each other when said selector element is adjusted from one of said stations to another, and means responsive to said adjustment of said selector element from one of said stations to another to control said power operating means and to manipulate said selector means.

CARL A. NERACHER.
TENO IAVELLI.